A. E. PARENT.
MILK AND CREAM CAPSULE.
APPLICATION FILED SEPT. 13, 1910.

991,354.

Patented May 2, 1911.

Witnesses
Harry King
C. C. Hines.

Inventor
Arthur E. Parent
By Victor J. Evans
Attorney

UNITED STATES PATENT OFFICE.

ARTHUR E. PARENT, OF LARAMIE, WYOMING.

MILK AND CREAM CAPSULE.

991,354. Specification of Letters Patent. Patented May 2, 1911.

Application filed September 13, 1910. Serial No. 581,788.

*To all whom it may concern:*

Be it known that I, ARTHUR E. PARENT, a citizen of the United States, residing at Laramie, in the county of Albany and State of Wyoming, have invented new and useful Improvements in Milk and Cream Capsules, of which the following is a specification.

This invention relates to a milk or cream capsule, or drop, the object being to provide a simple, sanitary and convenient mode of preserving and furnishing a sufficient amount of milk or cream for individual use as a flavoring or enriching agent for coffee, tea and other beverages, and which may be employed by simply dropping it into the receptacle containing the beverage.

Figure 1:
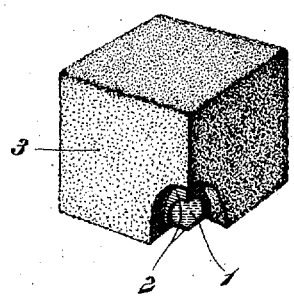
Figure 2:
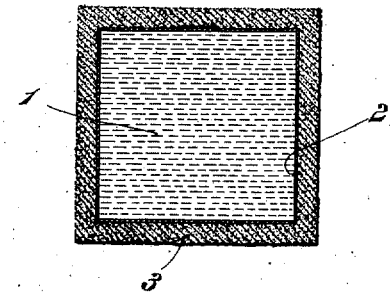

In the accompanying drawing:—Figure 1 is a perspective view of a milk or cream capsule embodying my invention. Fig. 2 is a sectional view of the same.

In carrying my invention into practice, I provide a capsule comprising a body 1, an inclosing shell 2, and an outer casing 3. The body 1 is composed of a sufficient amount of evaporated milk or cream, or mixture of both, for individual use, which is inclosed within the shell 2. The said shell 2 may consist of waxed (paraffin) paper, sealed air tight by a primary outer coating of albumen, such as white of egg. The body 1 is thus inclosed in a hermetically closed container, whereby it will be preserved against decomposition and prevented from drying out.

In practice, the shell 2 may be square or of cubical form, and is covered by the coating 3, which preferably consists of granulated sugar, imparting to the article the appearance of an ordinary cube of sugar. This coating may be sufficient in quantity to sweeten the beverage to a desired degree.

In the use of the article, a single cube or capsule is dropped into the cup of beverage and broken by the use of a spoon, thus liberating the flavoring cream.

Having thus described my invention, I claim:—

1. As a new article of manufacture, a flavoring or enriching cartridge for beverages comprising a body of evaporated milk or cream sufficient in amount to flavor an individual cup, an insoluble shell inclosing the same, a primary coating of albumen hermetically sealing the shell, and an outer coating of saccharine material covering said primary coating.

2. As a new article of manufacture, a flavoring or enriching cartridge for beverages comprising a body of evaporated milk or cream sufficient in quantity to flavor an individual cup, a paper shell inclosing the same, a primary coating of albumen hermetically sealing said shell, and an outer coating of saccharine material covering said primary coating.

In testimony whereof I affix my signature in presence of two witnesses.

ARTHUR E. PARENT.

Witnesses:
  W. H. GRAHAM,
  E. D. HISKEY.